United States Patent [19]
Rotondi

[11] 3,932,152
[45] Jan. 13, 1976

[54] MULTI-STAGE BLOW-PIPE CONSTRUCTION

[75] Inventor: Aldo Rotondi, North Plainfield, N.J.

[73] Assignee: U.S. Filter Corporation, New York, N.Y.

[22] Filed: May 8, 1974

[21] Appl. No.: 468,211

[52] U.S. Cl. ............................................. 55/302
[51] Int. Cl.² .................................... B01D 46/04
[58] Field of Search ........ 55/96, 302, 303; 98/40 C, 98/40, 43, 40 VM, 40 N

[56] References Cited
UNITED STATES PATENTS

| | | |
|---|---|---|
| 815,093 | 3/1906 | Keeney .......................... 98/40 R |
| 2,354,155 | 7/1944 | Sternberg ...................... 98/40 VM |
| 3,648,442 | 3/1972 | Bourne .............................. 55/302 |
| 3,757,497 | 9/1973 | Ray ..................................... 55/302 |
| 3,837,150 | 9/1974 | Kubiak ............................... 55/302 |

*Primary Examiner*—Bernard Nozick

[57] ABSTRACT

An improved multi-jet nozzle construction for pulse-jet dust collectors including a multi-stage blow-pipe assembly incorporating at least one selectively located internal restriction disposed in facing relation to the direction of flow of compressed cleaning gas therethrough.

2 Claims, 3 Drawing Figures

U.S. Patent   Jan. 13, 1976   3,932,152
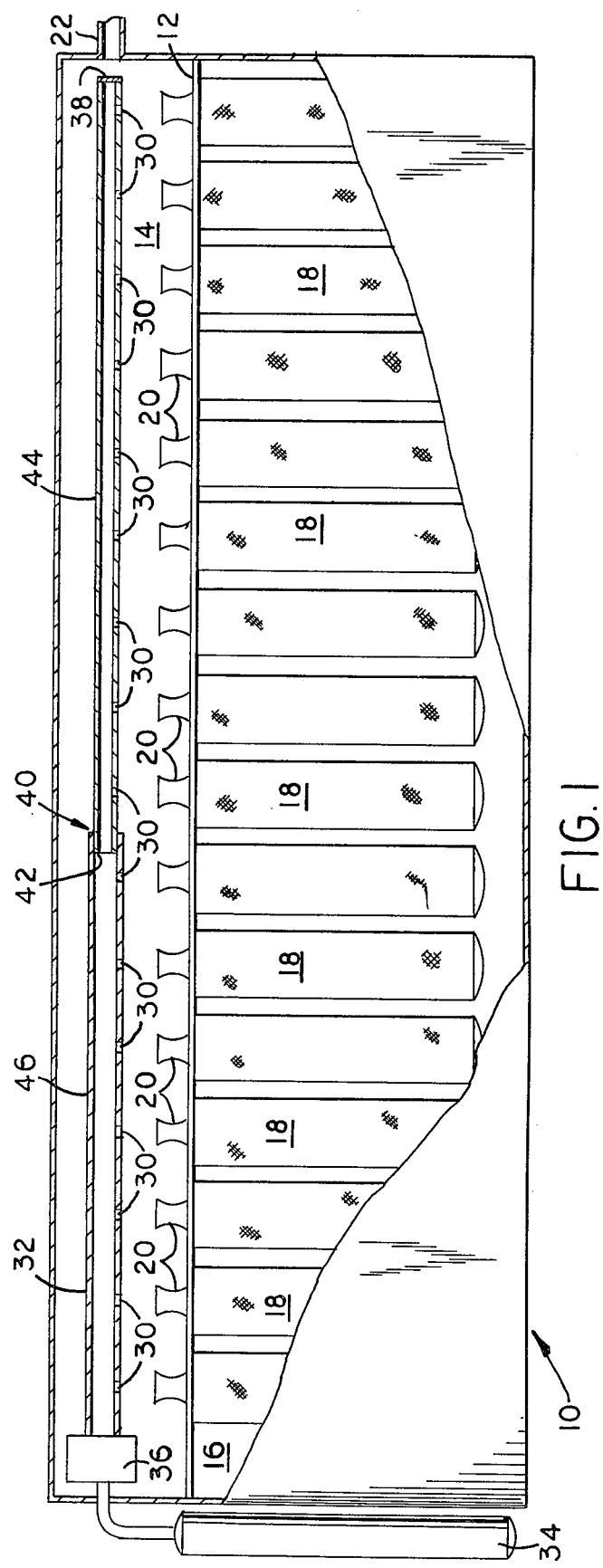
FIG. 1
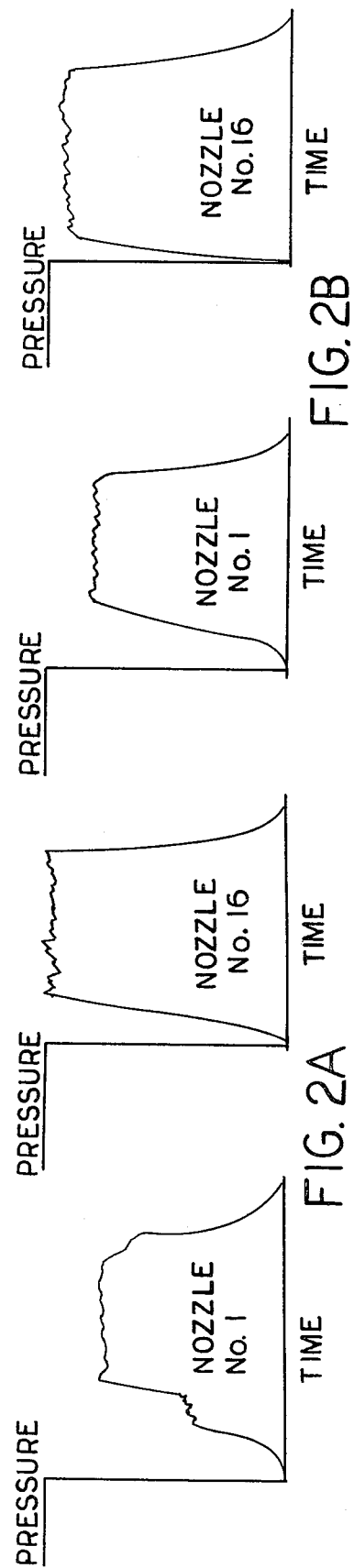
FIG. 2A
FIG. 2B

MULTI-STAGE BLOW-PIPE CONSTRUCTION

This invention relates to dust collector construction and particularly to improved multi-jet nozzle system constructions for pulse-jet type dust collectors.

Fabric media dust collectors employing pulse-jet cleaning systems as broadly disclosed in Church Reissue U.S. Pat. No. 24,954 are currently in widespread use for effecting the separation of particulates from gaseous streams. A conventional construction for such type of unit employs one or more blow-pipes each having a plurality of apertures therein for delivery of the cleaning gases in jet form into desired proximity with the open end of the filter chambers or the like. Each of said apertures is normally disposed in spaced coaxial alignment with the open end of an elongate filter sock and each of said blow pipes is normally connected to a remote source of compressed cleaning gas, usually air, through a quick acting valve member so as to permit simultaneous cleaning of a plurality of filter socks with a single valve actuation. While employment of a minimum number of such quick acting valves is economically desirable, maximum realization thereof has been practically limited by the number of jet nozzle apertures that may be effectively included in a given length of blow pipe without effecting undesirable deterioration in emitted pulse-jet performance characteristics.

This invention may be briefly described as an improved nozzle construction for pulse-jet type dust collectors which includes, in its broader aspects, a multi-stage blow pipe assembly incorporating at least one selectively located internal restriction disposed in facing relation to the direction of flow of compressed cleaning gas therethrough.

Among the advantages attendant the practice of the subject invention is a permitted reduction in the number of quick acting valve elements required for use in pulse-jet dust collectors with attendant reduction in cost and simplification of construction. Another advantage is the provision of more uniform pulse emission characteristics and distribution of energy along the length of a blow tube. Still further advantages of the subject invention include permitted increases in the number of jet nozzles includable in blow pipes associated with a single quick acting valve member and the provision of more rapid and uniform jet emission patterns that will be generally productive of better shock effects and improved filter bag cleaning.

The object of this invention is the provision of an improved multi-jet blow pipe system for emission of cleaning air in pulse-jet type dust collectors.

Other objects and advantages of the subject invention will become apparent from consideration of the following portions of this specification and from the appended drawings, which illustrate, in accordance with the mandate of the patent statutes, a presently preferred blow pipe construction incorporating the principles of this invention.

In the Drawings:

FIG. 1 is a schematic elevational view, partially in section, of the essentials of a multi-jet blow pipe assembly incorporating the principles of this invention.

FIGS. 2a and 2b are schematic representations of comparative pressure traces obtained from conventionally constructed multi-jet nozzle assemblies and those constructed in accord with the principles of this invention.

Referring to the drawings and particularly to FIG. 1, thereof, there is schematically set forth some of the essential operating components of pulse-jet type of dust collectors. Such type collectors conventionally include a perimetric housing section, normally of modular character and generally designated 10, having a transverse tube sheet 12 mounted therein which operatively sub-divides the interior of the housing module into clean and dirty air plenum chambers 14 and 16, respectively. Dependently supported by the tube sheet 12 within the dirty air plenum 16 are a plurality of elongate cylindrical filter socks 18 mounted on suitable retainers (not shown). Such filter socks 18 are conventionally formed of felted or fabric material or other suitable dry type filter medium and the interiors of the filter chambers defined thereby are disposed in fluid communication with the clean air plenum chamber 14 through the upper open ends thereof which normally include individual venturi means 20. In normal filter flow operation of such units, the gaseous carrier is induced to flow from the dirty air plenum 16 through the filter socks 18, upwardly therewithin and through the venturi means 20 into the clean air plenum 14 and from thence externally of the housing section 10 by a fan or other prime movant disposed downstream in the clean air exhaust conduit 22.

In conventional pulse-jet dust collectors, each housing section or module 10 will normally contain a plurality of such filter socks 18 positioned in predetermined geometric arrangement to facilitate economic cleaning thereof. In the larger modular units often as many as 16 separate filter socks 18 are disposed in line and are adapted to be subjected to simultaneous cleaning. Disposed in coaxial alignment with and in spaced relation from each of the venturis 20 is a jet nozzle 30, suitably in the form of a small aperture, as for example of ¼ inch to ½ inch diameter, in the wall of an elongate blow pipe unit 32 having one terminal end sealed, as at 38, and the other end connected to a source of compressed cleaning gas 34 through a quick acting valve assembly 36. Conventionally, a single blow pipe having appropriately located nozzle apertures 30 is adapted to operatively service a plurality of lineally arranged filter socks in the general manner illustrated in the drawings.

In the cleaning cycle phase of operation of such pulse jet type dust collectors, the quick acting valve 36 is periodically actuated to permit the transfer of compressed cleaning gas from the source 32 thereof into the interior of the blow-pipe 32 and from which it exits in jet form from the nozzles 30 as pulses of high energy gas of very short duration, i.e. — normally of 1/10 second or less. In a properly designed pulse-jet dust collector, such emitted pulses operate to momentarily halt the normal filter flow of cleaned gas upwardly through the venturis and create an abrupt pressure rise within the interior of the filter socks with a concomitant shockwave like action to effect a cleaning thereof. Uniformity of high efficiency cleaning of the filter socks dictates that character of the pulse-jets of cleaning gas emitted along the length of the blow pipes, and in particular the rapidity of the pressure rise effected thereby, be of essentially uniform character. However, a marked deterioration in the pulse characteristics results when a blow-pipe served by a single quick acting valve is unduly elongated to serve an increased number of filter sections.

FIG. 2a is, by way of example, schematically illustrative of the pressure-time characteristics of such pulses as would be emitted from ¼ inch diameter terminal jet nozzles No. 1 and No. 16 of an elongated blow-pipe of 1 inch standard pipe adapted to serve 16 lineally arranged filter socks in conventional construction. As is apparent, the character of the pulse emanating from the jet nozzle No. 1, i.e. — the jet nozzle 30 disposed closest to the valve member 36, is of markedly different and less effective character than that emanating from jet nozzle No. 16 disposed adjacent to the sealed terminal end 38 thereof. The difference in the nature of the initial pressure rise characteristics is particularly apparent. The trace for nozzle No. 16 is of the desired abrupt character productive of the efficacious shock-wave effects, whereas the trace for nozzle No. 1 is, quite unexpectedly, of markedly deteriorated character. Similar deterioration but of progressively lesser magnitude occurs on the nozzles adjacently downstream of nozzle No. 1.

In accordance with the principles of this invention, the blow-pipe 32 is provided with at least one selectively located internal restriction. As shown in FIG. 1 by way of example, the blow-pipe 32 includes a single intermediately located internal restriction, generally designated 40, which serves to define an internal abutment or shoulder 42 disposed in substantially perpendicular facing relation to the direction of flow of cleaning fluid within said blow-pipe. The inclusion of such restriction and selective location thereof is conveniently effected by making the blow-pipe 32 of two different sizes of standard pipe, so that the downstream portion 44 thereof is of lesser external and internal diameter than that of the upstream portion 46 thereof. By way of specific example, the initial or upstream portion 46 may suitably be constituted of 1 inch diameter Schedule 40 pipe and the downstream portion 44 constituted by ¾ inch Schedule 40 pipe. Where a single internal restriction 40 is employed it should desirably be located in the vicinity of the mid-length of the blow-pipe 32 considered in terms of cumulative jet nozzle area and which for blow-pipes having uniformly spaced jet nozzles will be in the middle thereof plus or minus about 10%. Preferably such restriction will be disposed somewhat closer to the valve 36 than to the sealed terminal end 38 thereof. Information available to date for a 16 hole blow-pipe incorporating substantially equally spaced ¼ inch jet nozzle apertures in standard pipe of the dimensions set forth above indicates that the preferred location for a single internal restriction 40 lies between holes 7 and 8. In more general terms, a single internal restriction 40 should desirably be located slightly in advance of the location where a 50% dividing line appears in cumulative jet nozzle area. In a similar manner, when a plurality of restrictions are employed, they should be located in relatively uniform spacing, intermediate the terminal jet nozzles.

Although not fully understood at the present time, operations to date appear to indicate that the inclusion of the restriction 40 in a blow-pipe in the manner described above results in the emission of substantially equal amounts of energy through the first jet nozzle of the blow-pipe as is emitted through the last jet nozzle thereof. Moreover, the inclusion of such restriction, as is apparent from FIG. 2b, results in a marked improvement in abruptness of the pressure rise, i.e. — a shorter rise time, and in markedly improved characteristics of the initial pressure time trace for the upstream nozzles which provides a markedly improved shock effect and better and more uniform cleaning of all the filter socks being served by a given blow pipe.

Having thus described my invention, I claim

1. In a pulse-jet dust dust collector wherein a plurality of elongate open ended filter socks are simultaneously subjected to cleaning by the abrupt emission of short duration jet pulses of cleaning gas selectively directed into the open ends thereof, the improvement comprising terminally sealed elongate hollow blow-pipe means connected to a remote source of pressurized cleaning gas through a quick acting valve and having a plurality of selectively located apertures therein for effecting the delivery of said selectively directed pulses of said cleaning gas therefrom into the open ends of said filter socks upon actuation of said valve to effect cleaning thereof, and means defining an internal gas impervious restriction at about the mid length of said blow pipe means extending inwardly from the internal defining wall of said blow pipe and disposed substantially perpendicular to the direction of flow of cleaning fluid within said blow-pipe means to abruptly reduce the cross-sectional area of said blow-pipe means available for cleaning gas flow therethrough and to increase the rate of emission of cleaning gas from said apertures disposed adjacent to said valve.

2. Apparatus as set forth in claim 1 wherein said internal gas impervious surface is located slightly in advance of a location defined by 50% of accumulated jet nozzle area therein measured in the downstream direction.

* * * * *